United States Patent [19]

Blum

[11] Patent Number: 5,076,978

[45] Date of Patent: Dec. 31, 1991

[54] METHOD OF PRODUCING GYPSUM DECORATIVE MOLDING

[76] Inventor: Kurt E. Blum, 907 E. Burton St., Murfreesboro, Tenn.

[21] Appl. No.: 318,965

[22] Filed: Mar. 6, 1989

Related U.S. Application Data

[63] Continuation of Ser. No. 97,649, Sep. 14, 1987, abandoned.

[51] Int. Cl.[5] ........................ B32B 1/10; B32B 13/08; C04B 11/00; B29C 63/22

[52] U.S. Cl. ........................................ 264/42; 156/42; 156/44; 106/772; 106/783; 264/46.6; 264/250; 264/256; 264/267

[58] Field of Search ....................... 156/40, 41, 42, 43, 156/44; 106/109, 110, 772, 783; 264/267, 42, 46.6, 250, 256

[56] References Cited

U.S. PATENT DOCUMENTS

| | | | |
|---|---|---|---|
| 1,184,591 | 5/1916 | Henning | 156/41 |
| 1,808,003 | 6/1931 | New | 156/40 |
| 1,970,029 | 8/1934 | Brunner | 156/40 |
| 2,168,803 | 8/1938 | Page | 156/44 |
| 2,803,575 | 8/1957 | Riddell et al. | 106/109 |
| 3,376,147 | 4/1968 | Dean | 106/109 |
| 3,887,406 | 6/1975 | Gwynne | 156/44 |
| 4,043,825 | 8/1977 | Muller et al. | 106/109 |
| 4,081,283 | 3/1978 | Lankard et al. | 106/109 |
| 4,187,275 | 2/1980 | Bracalielly et al. | 156/40 |
| 4,239,716 | 12/1980 | Ishida et al. | 106/109 |
| 4,687,694 | 8/1987 | Kuper et al. | 106/110 |
| 4,693,924 | 9/1987 | Kuper et al. | 106/110 |

*Primary Examiner*—Gary P. Straub
*Attorney, Agent, or Firm*—Mark J. Patterson; Edward D. Lanquist, Jr.

[57] ABSTRACT

Decorative interior molding is molded from a slurry of gypsum, water, perlite, and a foaming agent. The slurry is surrounded by paper, cured, and dried.

3 Claims, 2 Drawing Sheets

METHOD OF PRODUCING GYPSUM DECORATIVE MOLDING

This is a division application of application Ser. No. 07/097,649 filed Sept. 14, 1987, now abandoned.

BACKGROUND OF THE INVENTION

The present invention relates to the production of decorative moldings used in the interior construction of buildings, and specifically to the composition and method of making moldings made of gypsum or plaster.

Ornamental or decorative moldings are frequently used to improve the appearance of the interior of homes and offices. Crown molding and chair rail are common examples of such uses. It was common years ago to have such moldings or cornices created on site using ornamental plastering techniques. Because of the difficulty in finding and paying for skilled plasterers, most decorative interior moldings are now pre-milled and cut from hard or soft woods and installed by a trim carpenter. Nevertheless, most wood crown molding, for example, is still too expensive for routine use, costing in excess of One Dollar per foot. It is also recognized in the industry that most interior moldings are not structural, and are painted, not stained. Therefore, moldings made of wood are not essential and have the disadvantage of being combustible.

The prior art has acknowledged the usefulness of gypsum or equivalent materials such as plaster in the molding of objects for construction uses. U.S. Pat. Nos. 4,221,599; 4,239,716; and 4,540,439 all discuss the manufacture of molded gypsum materials. However, the techniques disclosed do not result in a lightweight, strong and easy to manufacture molding which is specifically adapted for decorative interior use.

SUMMARY OF THE INVENTION

In the present invention, calcined gypsum or molding plaster is mixed with water, perlite, and a foaming agent to form a slurry. A mold having desired chair rail, crown mold, or similar pattern is lined with wet paper which is conformed to the mold using pressure. The slurry is poured into the mold and, again using pressure, excess material is removed. Wet paper is layered over the top of the molded slurry. The molded slurry is allowed to cure and is then air or heat dried.

DESCRIPTION OF THE PREFERRED EMBODIMENT

Figure 2:
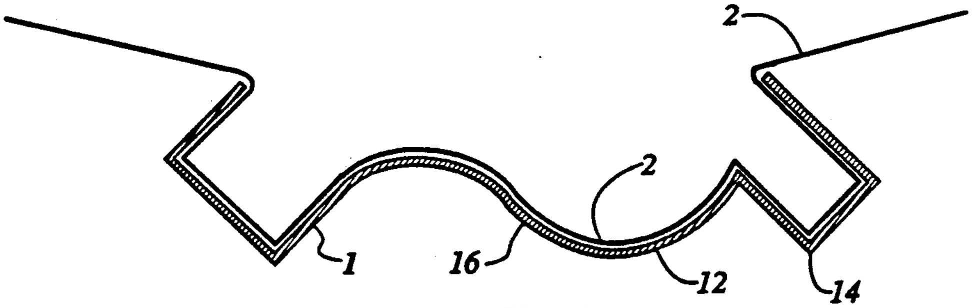
FIG. 2 is an end view of a mold used in forming crown molding or chair rail.

In the present invention, as seen in FIG. 2, a mold 1 is selected which has the desired shape for making decorative chair rail, crown, or similar molding. Construction paper 2 such as that used to manufacture gypsum board, is wetted and conformed to the shape of mold 1, leaving sufficient excess paper to cover the back of the molded piece.

Figure 1:
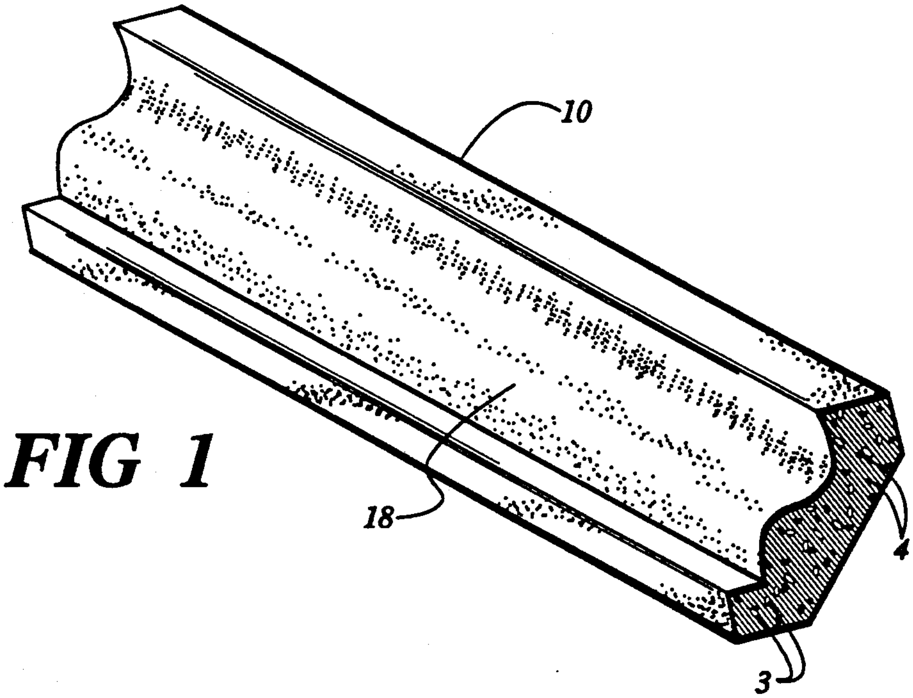
FIG. 1 is a perspective view of a section of completed crown molding.
Figure 3:
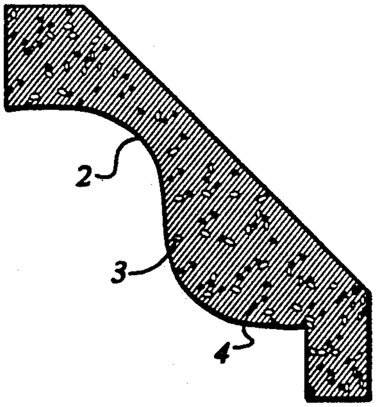
FIG. 3 is an enlarged cross-sectional end view of a section of crown molding.

Meanwhile, a slurry has been prepared using gypsum or molding plaster, water, perlite, and a foaming agent. Testing has shown that a mixture of three parts gypsum or plaster, two parts water, and three to four and one-half parts perlite will produce a satisfactory result. The perlite is used as a lightweight strengthening agent, and other similar lightweight aggregates such as pumice, scoria, vermiculite or diatomite can be substituted. The slurry is poured into mold 1, and excess material is removed by rolling, for example, across the back of mold 1. The excess portions of paper 2 can then be folded over the back of the molded slurry. The slurry is allowed to cure and dry, during which time the foaming agent creates voids 3 in the molding to lighten it. FIGS. 1 and 3 show the perlite sections 4 mixed in the slurry. The molding can then be removed from mold 1 and is ready for use. It can be easily cut using a scoring knife or saw and can be fastened to walls and corners using cement or thin nails.

Figure 5:
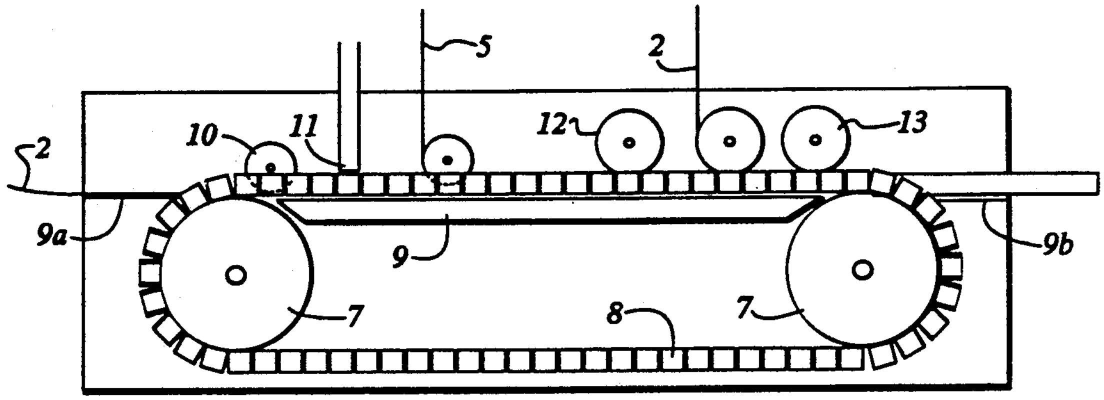
FIGS. 5 and 6 are side and top views, respectively, of a typical means for mass production of gypsum molding.
Figure 6:
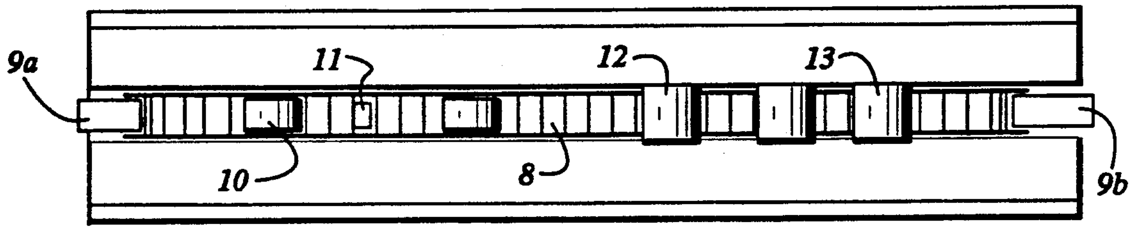

FIGS. 5 and 6 show a block set-up of a typical machine that can be used for continuous large scale production of gypsum molding. Motion driven pulleys 7 engage molding channel 8 which can be made of flexible, hard rubber or similar material. The inside surfaces of channel 8 are shaped to provide the desired molding pattern. The upper section of channel 8 is supported by channel support 9.

Figure 4:
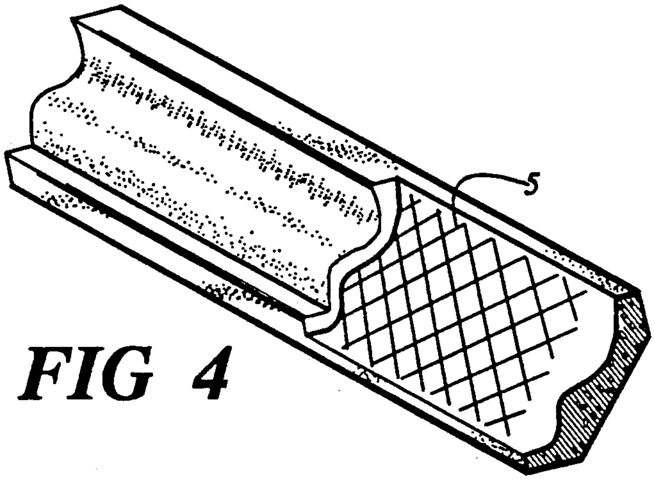
FIG. 4 is a partially cutaway perspective view of a piece of crown molding with metal reinforcing grid.

Paper 2 is continuously fed through channel 8 from channel support section 9*a*. Roller 10, which has a rolling surface shaped to mate with the inner surface of channel 8, conforms paper 2 to the shape of channel 8. The molding slurry is then poured into channel 8 at slurry port 11. Excess paper 2 is folded over using roller 12, and final shaping is done by roller 3. Preferably, a second layer of paper is laid across the back before final shaping is done by roller 13. The molded slurry and paper combination is removed through channel support section 9*b*after which it can be cured and cut.

Where extra strength is desired, a metal grid 5, as seen in FIG. 4 can be placed in the slurry before curing. Placing grid 5 in closer proximity to paper 2 will provide greater impact resistance.

Referring again to FIGS. 1, 2, 5, and 6, the process of achieving molding with arced portions 12 and angular portions 14 is shown. Mold 1 has face 16 which corresponds to visible portion 18 of molding 10. Mold 1 has sides 20 and face 16.

What I claim is:

1. An improved method of producing crown molding and chair rail molding comprising the steps of:

(a) wetting and conforming construction paper to the shape of a mold incorporating the desired decorative design, said mold having two sides and a face, said face comprising an arced portion and an angular portion, said arced portion and said angular portion disposed away from said sides, leaving unconformed a portion of said paper sufficient to cover the back of said decorative molding;

(b) pouring a slurry of gypsum or molding plaster, water, perlite, and a foaming agent into said mold;

(c) removing excess slurry from the open portion of said mold;

(d) folding the unconformed portion of said paper over the open portion of said mold;

(d) curing and drying said slurry within said mold; and (f) detaching said mold from said cured and dried slurry.

2. An improved method of large scale production of decorative gypsum molding wherein:

(a) motion driven pulleys engage a molding channel;

(b) said molding channel is shaped to provide the desired molding pattern, said molding channel having two sides and a face, said face comprising an arced portion and an angular portion, said arced portion and said angular portion disposed away from said sides;

(c) an upper section of said channel is supported by a channel support;

(d) paper is continually fed through said channel from a channel support section;

(e) said paper is formed to said molding channel;

(f) a molding slurry is poured into said channel at a slurry port;

(g) excess paper is folded over using a folding roller to cover backs of said gypsum molding;

(h) a shaping roller performs final shaping of said molding slurry; and (i) a molding slurry and paper combination is then removed through a second channel support section after which it can be cured and cut.

3. The method of large scale gypsum molding production of claim 2 wherein a metal grid is placed in said slurry before curing.

* * * * *